United States Patent
Gross et al.

(10) Patent No.: US 6,793,909 B2
(45) Date of Patent: Sep. 21, 2004

(54) DIRECT SYNTHESIS OF CATALYZED HYDRIDE COMPOUNDS

(75) Inventors: Karl J. Gross, Fremont, CA (US); Eric Majzoub, Pleasanton, CA (US)

(73) Assignee: Sandia National Laboratories, Livermore, CA (US)

( * ) Notice: Subject to any disclaimer, the term of this patent is extended or adjusted under 35 U.S.C. 154(b) by 4 days.

(21) Appl. No.: 10/066,375

(22) Filed: Jan. 29, 2002

(65) Prior Publication Data

US 2003/0143154 A1 Jul. 31, 2003

(51) Int. Cl.[7] .................................................. C01B 6/24
(52) U.S. Cl. ..................... 423/644; 423/646; 423/658.2
(58) Field of Search ............................... 423/644, 646, 423/658.2

(56) References Cited

U.S. PATENT DOCUMENTS

| | | | | |
|---|---|---|---|---|
| 6,106,801 A | * | 8/2000 | Bogdanovic et al. | 423/648.1 |
| 6,251,349 B1 | * | 6/2001 | Zaluska et al. | 423/286 |
| 2003/0053948 A1 | * | 3/2003 | Bodanovic et al. | 423/658.2 |

FOREIGN PATENT DOCUMENTS

| WO | WO 99/19250 | * | 4/1999 | C01B/6/24 |
|---|---|---|---|---|
| WO | WO 01/68515 | * | 9/2001 | C01B/3/00 |

OTHER PUBLICATIONS

Balema, V.P.; Percharsky, V.K.; Dennis, K.W.; "Solid state phase transformation in LiAlH4 during high–energy ball–milling", Journal of Alloys and Compounds, v.313 pp. 69–74, (2000).

Balema, V.P.; Wiench, J.W.; Dennis, K.W.; Pruski, M.; Pecharsky, V.K.; "Titanium catalyzed solid–state transformations in LiAlH4 during high–energy ball–milling", Journal of Alloys and Compounds, v.313 pp. 108–114, (2001).

* cited by examiner

Primary Examiner—Stanley S. Silverman
Assistant Examiner—Maribel Medina
(74) Attorney, Agent, or Firm—Timothy P. Evans

(57) ABSTRACT

A method is disclosed for directly preparing alkali metal aluminum hydrides such as $NaAlH_4$ and $Na_3AlH_6$ from either the alkali metal or its hydride, and aluminum. The hydride thus prepared is doped with a small portion of a transition metal catalyst compound, such as $TiCl_3$, $TiF_3$, or a mixture of these materials, in order to render them reversibly hydridable. The process provides for mechanically mixing the dry reagents under an inert atmosphere followed by charging the mixed materials with high pressure hydrogen while heating the mixture to about 125° C. The method is relatively simple and inexpensive and provides reversible hydride compounds which are free of the usual contamination introduced by prior art wet chemical methods.

12 Claims, 6 Drawing Sheets

DIRECT SYNTHESIS OF CATALYZED HYDRIDE COMPOUNDS

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

BACKGROUND OF THE INVENTION

1. Technical Field

This invention relates to a method of producing a catalyzed alkali metal-aluminum hydride.

2. Background Art

Alkali metals (lithium, sodium and potassium) form a wide variety of simple hydrides and complex intermetallic hydrides that are commonly used as reducing agents in various processes of organic chemistry. While simple alkali earth hydrides may be produced by direct reaction between molten alkali metal and hydrogen (at very high pressures and temperatures) preparation of the more complex hydrides of these metals has required development of specialized, individual processes.

Hydrides of aluminum with lithium, sodium, and potassium have been known for many years. A direct synthesis method to produce these materials was first described (French Patent Serial Number 1,235,680). According to Ashby, synthesis of, for instance, $NaAlH_4$ can be performed by placing either the alkali metal or its hydride into an autoclave with activated aluminum powder in a solvent such as tetrahydrofuran. The mixture is subjected to hydrogen at a pressure of 2000 psi (about 135 atm) and heated to 150° C. for several hours after which the mixture is cooled, the excess aluminum is separated by filtration, and the $NaAlH_4$ isolated by precipitation using a hydrocarbon additive such as toluene to the tetrahydrofuran solution, followed by vacuum distillation of the tetrahydrofuran. The method is applicable to the production of $LiAlH_4$, $NaAlH_4$, $KAlH_4$ and $CsAlH_4$.

Others (Zakharin, et al., Dokl. Akad. Nauk SSR, vol. 1, No. 145, p. 793, 1962; Dvorak, et al. U.S. Pat. No. 3,357, 806; Tranchant, et al. French Patent Serial Numbers 7,020, 279 and 6,914,185) developed similar processes each of which relied on the use of an organic solvent.

While alkali-metal based complex hydrides were developed to serve as reducing agents in chemical reactions, other applications of these hydrides have also been considered in recent years. In particular, the development of hydrogen as an alternative to fossil fuels has spurred the search for materials capable of serving as economic sources for hydrogen storage and retrieval. Due to their gravimetric energy densities, hydrides of the alkali metals are very attractive. Most of these hydrides undergo decomposition releasing hydrogen at moderate temperatures (<150° C.).

However, the alkali metal hydrides prepared in the traditional manner act only to irreversibly release hydrogen under moderate conditions. While Bogdanovic, et al., (U.S. Pat. No. 6,106,801) have reported that the addition of a transition metal compound acts as a catalyst to aid in the re-absorption of hydrogen, the kinetics of this system have been reported to be slow and unstable. Zaluska, et al., (U.S. Pat. No. 6,251,349) have reported reversible absorption and desorption of hydrogen is achieved in complex alkali metal-aluminum hydride compounds prepared by mechanical mixing/milling mixtures of the simple hydrides without the catalyst reported by Bogdanovic, et al.

SUMMARY OF THE INVENTION

The present invention provides a totally different method for preparing alkali metal-aluminum hydrides which is based on simple a two step-process. The resulting hydrides exhibit outstanding reversible hydrogenation properties.

In accordance with one aspect of the invention there is provided a method of producing an alkali metal-aluminum hydride comprising mechanically milling powders of a simple alkali metal hydride material with a metal and a titanium catalyst compound followed by high pressure hydrogenation at temperatures above about 60° C. The alkali metal hydride is NaH, the metal powder is aluminum, and the titanium catalyst compound is $TiCl_3$, $TiF_3$, or a mixture of equal parts of these two compounds.

In another aspect of this invention, there is provided a method of producing an alkali metal-aluminum hydride comprising mechanically milling powders of an alkali metal with a metal powder and a titanium catalyst compound, wherein the alkali metal is sodium, and the metal powder is aluminum and the titanium catalyst compound is $TiCl_3$, $TiF_3$, or a mixture of equal parts of these two compounds.

In yet another aspect of this invention, there is provided a method for preparing an alkali metal-aluminum hydride in a two-step solid-state reaction, wherein the first step comprises mechanical milling and the second comprises high pressure hydrogenation at elevated temperatures.

In the first step, the method is performed with dry powders of the components (i.e., without a solvent or any other suspension aid) under a blanket of a dry inert gas such as argon. The method is accomplished by subjecting the chosen reagent materials to a mechanical milling means, wherein the milling means consists of a ball mill, a plate or impact grinder, a blade, rod or whisk mixer, blender, or agitator.

In the second step, the method is completed by heating the milled contents to a temperature of about 100° C., while maintaining a hydrogen gas pressure in the container above the equilibrium plateau pressure of the reaction, (above about 30 atm hydrogen).

In yet another aspect of the invention the pressure of hydrogen gas is maintained at about 100 atm of hydrogen while heating the milled mixture to an initial temperature of about 125° C.

In another aspect of the invention there is provided catalyst doped alkali metal-aluminum hydrides which effectively function as a recyclable source/sink for hydrogen gas.

DETAILED DESCRIPTION OF THE INVENTION

Figure 1:
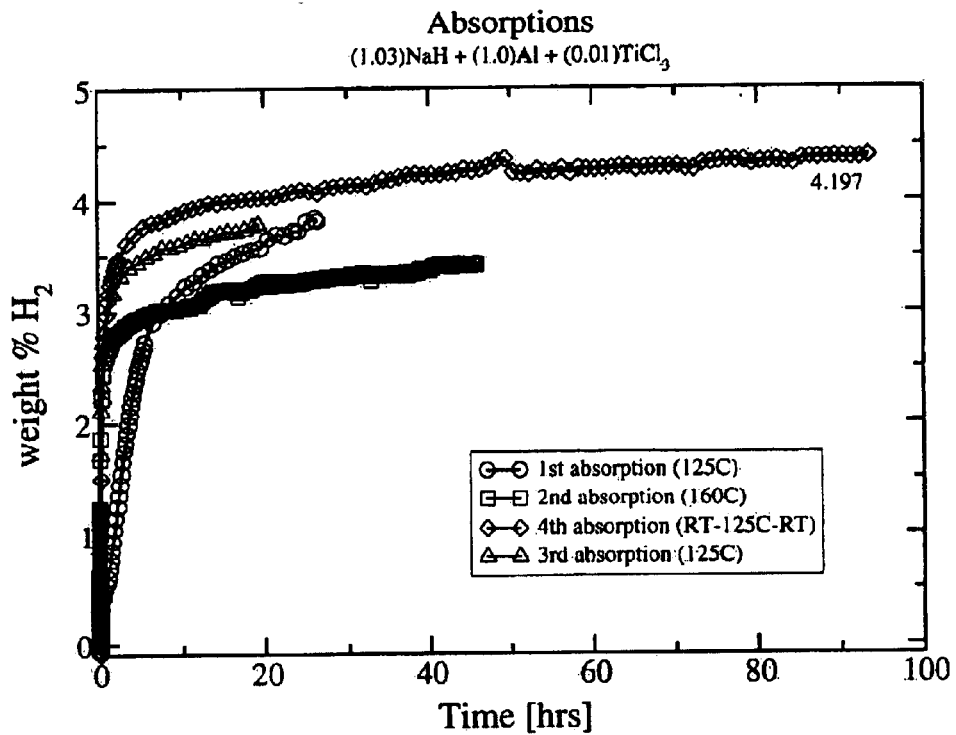
FIG. 1 illustrates the first four hydriding absorption cycles for the example of $NaAlH_4+Na_3AlH_6$ made by the process of the present invention with the starting of 1.03 moles $NaH+1.0$ mole $Al+0.01$ moles $TiCl_3$.

The hydrides of alkali metals and aluminum are compounds that belong to the larger class of complex hydrides. These compounds are known to liberate copious amounts of hydrogen either by direct thermal decomposition or by one-time hydrolysis. However, they were generally considered too irreversible for practical hydrogen storage applications. This was until Bogdanovic, et al., (Bogdanovic and Schwickardi, J. Alloys and Compounds, vol. 253, no. 1, 1997) demonstrated that NaAlH$_4$, would reversibly desorb and absorb hydrogen under relatively mild conditions when doped with one of a number of catalyst compounds. Since that time there has been a growing body of work in characterizing catalyzed alkali metal-aluminum hydrides, as well as the development of new catalysts and methods of preparation.

The present invention provides a method for the preparation and production of alkali metal-aluminum hydrides. The method is believed to be general to the hydrides of alkali metals (Li, Na, and K), as well as the simple hydrides of many of the alkaline earth (for example Mg, Ca, and Ba). Furthermore, it is also believed that aluminum may be substituted by a transition metal such as, for example, Co, Fe, Mn, Ni, Ti, V, and Zr. The invention, therefore, should not be construed as limited solely to the production of the alkali metals generally or sodium aluminum hydride specifically.

The present invention also avoids the problem of solvent contamination, associated with many of the prior art methods for fabricating alkali metal-aluminum hydrides, by providing a simple two step dry synthesis preparation process. Furthermore, the present method provides a means for preparing these materials from either the simple alkali hydrides or directly from the alkali metal itself.

General Method

In a particular embodiment, fabrication of alkali metal-aluminum hydrides comprise mixing powders of a simple alkali metal hydride (LiH, NaH, KH) with aluminum powder and a transition metal catalyst compound (typically a titanium catalyst compound such as TiCl$_3$, TiF$_3$, or mixtures of equal parts of these materials) in the desired proportion and ball milling the constituents under an inert atmosphere of argon gas. (While not attempted, other dry gases such as helium, hydrogen are also believed to be effective). The milling step is carried out at or near room temperature.

In especially preferred embodiments, fabrication of the alkali metal-aluminum hydride comprises mixing powders of an alkali metal (Li, Na, and K) with aluminum powder and a transition metal catalyst compound (typically a titanium catalyst compound such as TiCl$_3$, TiF$_3$, or mixtures of these materials) in the desired proportion and ball milling the constituents in an inert atmosphere of argon, for a period of up to about 2 hours, and then hydrogenating the milled mixture at high pressure while heating the mixture externally to an initial temperature of about 125° C. to provide a mixture of the stable tetravalent and hexavalent hydride intermetallic phases as follows:

$$Na + Al + 2H_2 \Leftrightarrow 1/3Na_3AlH_6 + 2/3Al + H_2 \Leftrightarrow NaAlH_4$$

Specific Embodiments

By way of example, the powders of the present invention are milled in a high energy ball mill such as are available from SPEX CertiPrep Inc., (203 Norcross Avenue, Metuchen, N.J. 08840). A SPEX™ 8000 series mixer/miller using tungsten carbide balls and operated at a weight ratio of powders-to-mill balls of about 1:9 was found to be suitable. A single batch of mixed powders comprised about 10 grams of material per run.

The powders were milled for a total milling time of 2 hours, at near room temperature, and under a high purity argon gas atmosphere that is gettered to remove oxygen contamination. After milling, about 1.5 grams of the mixture was transferred (again under an argon atmosphere) to a stainless steel reactor vessel with an internal volume of about 16 cm$^3$ and exposed to high purity (99.999%) hydrogen gas pressurized to between about 80 atm to about 100 atm while the steel reactor and its contents are heated externally with electrical tape to about 125° C. for up to 20 hours. Pressure measurements were taken using a calibrated 200 atm pressure transducer for the absorption half-cycle and a 1.3 atm calibrated Baratron™ capacitance manometer for the desorption half-cycle. Data was recorded with a computer.

Specific examples are provided below in order to better describe the invention.

EXAMPLE 1

In a first example, the hydrides NaAlH$_4$+Na$_3$AlH$_6$, were produced by combining 3.25 grams of NaH with 3.55 grams of aluminum metal powder and 0.203 grams of a TiCl$_3$ catalyst precursor compound (molar ratios of 1.03:1.0:0.01) and the mixture mechanically milled in a tungsten-carbide lined steel vial with several tungsten-carbide balls in a SPEX™ mill (SPEX™ 8000) packed at a powder-to-ball weight ratio of about 1:9. Excess alkali metal hydride is added to account for the formation of NaCl during processing. The process was carried out at room temperature and under an argon atmosphere. The mixture of powders was milled for about 2 hours. Excess alkali metal hydride was added to account for the formation of NaCl during processing.

After milling, about 1.5 grams of the mixture (under an argon atmosphere) was transferred to a stainless steel reactor vessel having an internal volume of about 16 cm$^3$ and exposed to high purity (99.999%) hydrogen gas. The vessel was pressurized with the hydrogen to between about 80 atm and 100 atm after which the steel reactor and its contents were heated externally, using an electrical tape, to about 125° C. Heating continued for up to 20 hours. Pressure measurements were taken by using a calibrated 200 atm pressure transducer for the absorption half-cycle and a 1.3 atm calibrated Baratron™ capacitance manometer for the desorption half-cycle. Data was recorded with a computer.

Figure 2:
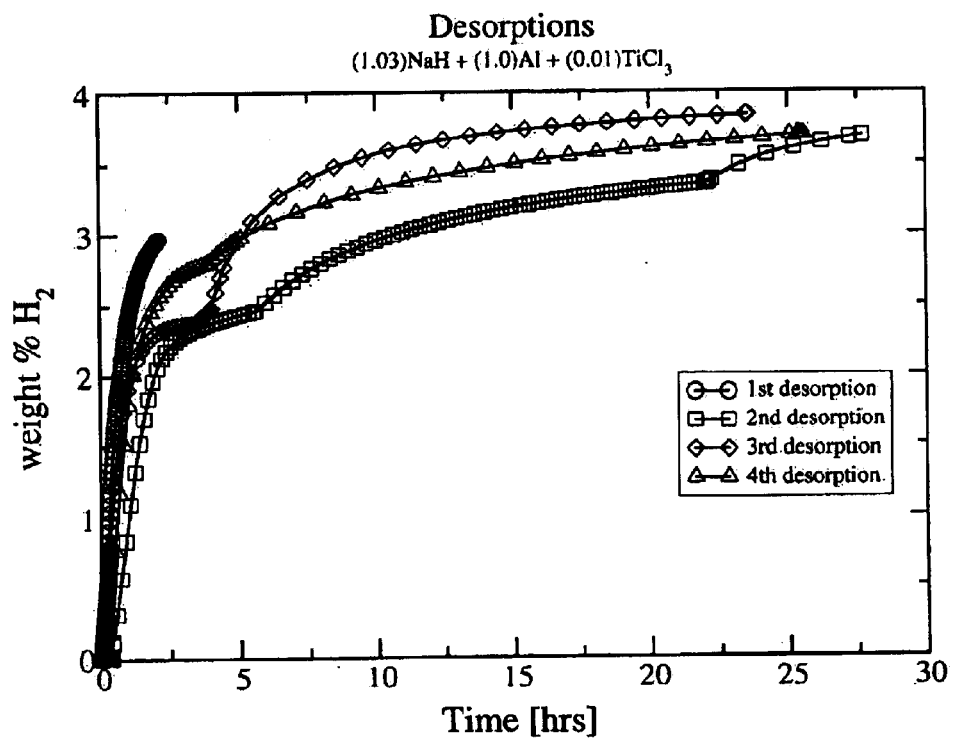
FIG. 2 illustrates the first four hydriding desorption cycles for the example of FIG. 1.

The initial hydrogenation step is shown in FIG. 1 as the $1^{st}$ absorption half-cycle ($1^{st}$ absorption) in this Example. FIGS. 1 and 2 show the next three absorption/desorption half-cycles. As seen in FIG. 1, the sample reaches about 90% of its initial first cycle capacity within about 20 hours, after which the rate of hydrogen absorption improves to about 5 hours in the subsequent half-cycles. FIG. 2 shows a desorption rate (to about 90% of capacity) occurs within about 2 hours.

EXAMPLE 2

Fabrication of a second example of the catalyzed hydrides $NaAlH_4+Na_3AlH_6$ was performed by mechanically milling 1.85 grams of NaH with 1.86 grams of aluminum metal powder and 0.289 grams of a $TiF_3$ catalyst precursor compound (molar ratios of 1.12:1.0:0.04) in a tungsten-carbide lined steel vial with tungsten-carbide balls in a SPEX™ mill. Processing was performed as described in Example 1 above; excess alkali metal hydride was added to account for the formation of NaCl during processing.

Figure 3:
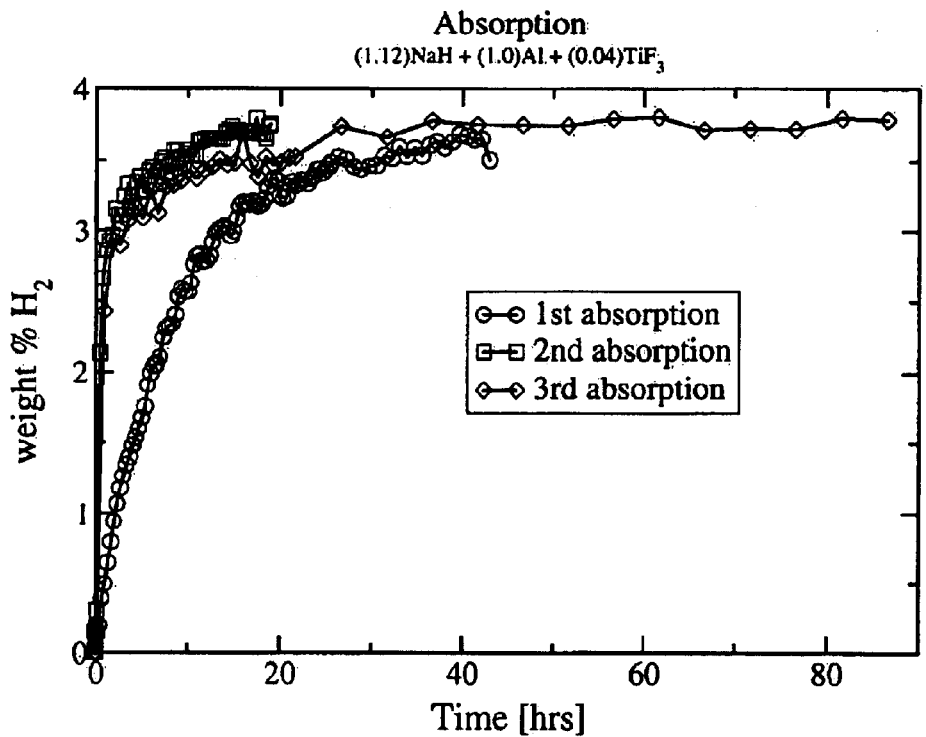
FIG. 3 illustrates the first three hydriding absorption cycles for the example of $NaAlH_4+Na_3AlH_6$ made by the process of the present invention with the starting of 1.12 moles $NaH+1.0$ mole $Al+0.04$ moles $TiF_3$.
Figure 4:
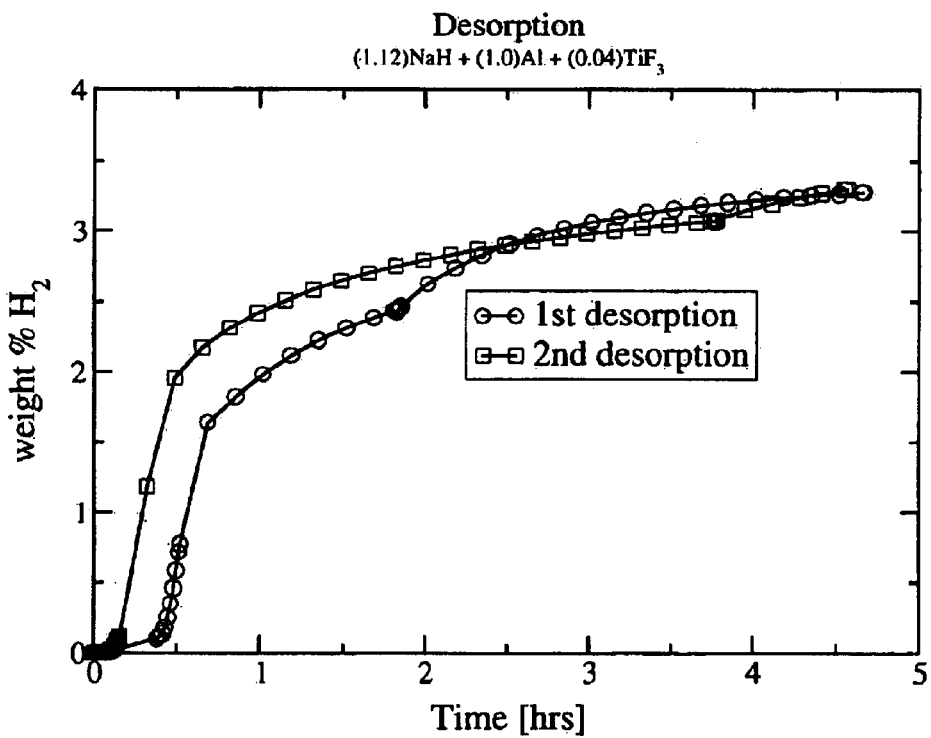
FIG. 4 illustrates the first two desorption hydriding cycles for the example of FIG. 3.

Initial hydrogenation is shown in FIG. 3 as the first half-cycle ($1^{st}$ absorption) in this example. Again, the sample reaches about 90% of its maximum capacity within about 20 hours. Subsequent absorption/desorption half-cycles ($2^{nd}$ and $3^{rd}$ absorption and $1^{st}$ and $2^{nd}$ desorption) for this example are shown in FIGS. 3 and 4. The rates of each subsequent absorption half-cycle after the initial half-cycle are seen to improve from under about an hour for 80% of maximum capacity, and to about 5 hours for 90% of capacity. FIG. 4 shows desorption of hydrogen to about 60% of capacity was achieved within about 1 hour and to about 90% of capacity within about 2.2 hours.

Figure 10:
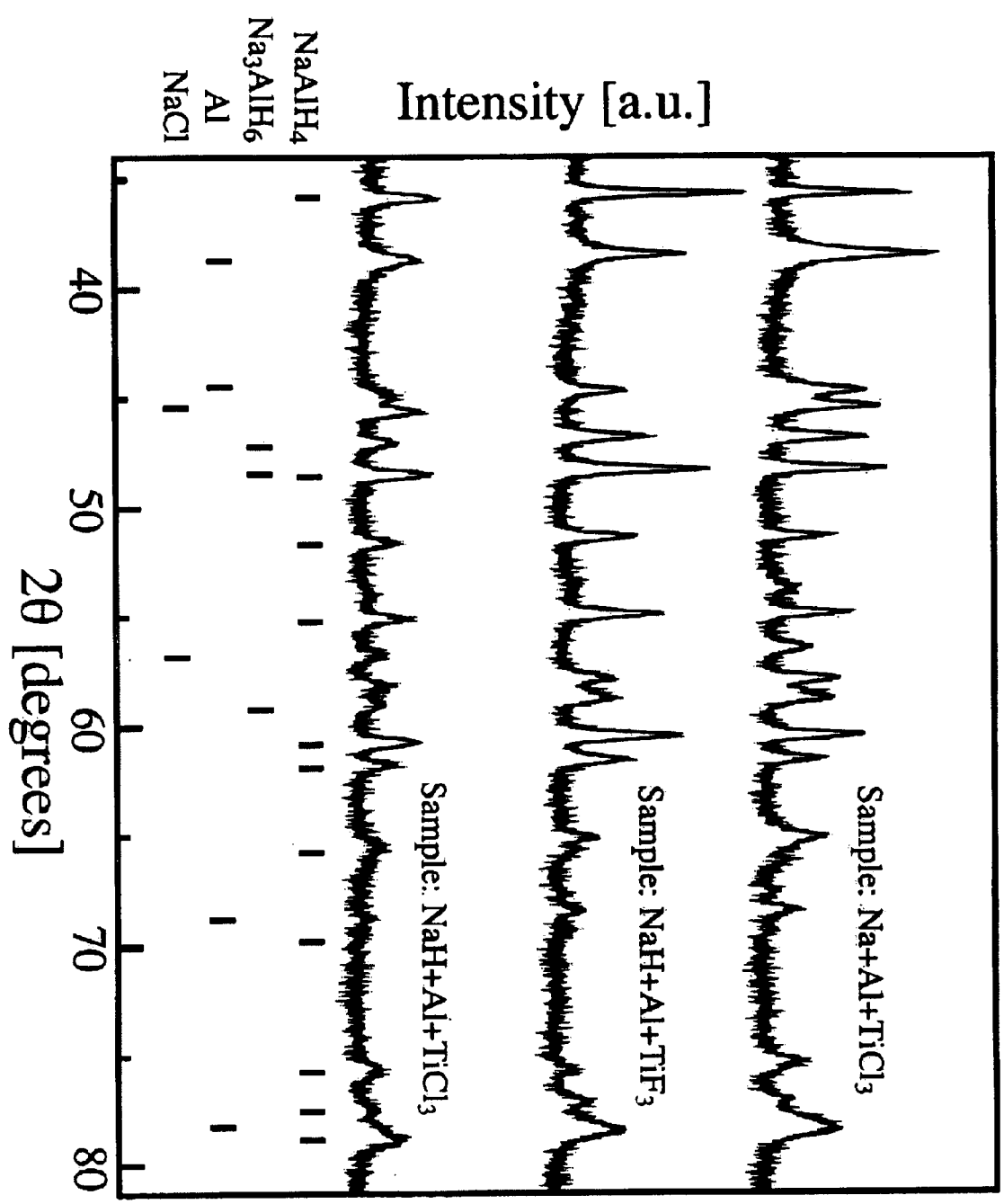
FIG. 10. Cu Kα X-ray diffraction patterns after hydriding samples of 1.0Na +1.0Al+0.02TiCl$_3$ (after 5 hydriding cycles); 1.12NaH+1.0Al+0.04TiF$_3$ (after 4 hydriding cycles); and 1.12NaH+1.0Al+0.04TiCl$_3$ (after 2 hydriding cycles)

Evidence of the formation of the alkali-metal aluminum hydrides $NaAlH_4+Na_3AlH_6$ in this example was confirmed by the x-ray diffraction pattern shown in FIG. 10. The pattern was obtained from a portion of the material after the $4^{th}$ hydriding cycle shown in FIG. 4 and is displayed as the middle or second of the three spectra shown in FIG. 10.

EXAMPLE 3

The preparation of the catalyzed hydrides $NaAlH_4+Na_3AlH_6$ directly from the alkali metal was demonstrated by mechanical milling 3.03 grams of sodium metal together with 3.56 grams of aluminum metal powder and 0.407 grams of a $TiCl_3$ catalyst precursor compound (molar ratios of 1.0:1.0:0.02) in a tungsten carbide lined steel vial with tungsten carbide balls in a SPEX™ mill. In this example processing proceeds as before except that the sodium metal is introduced into the ball mill as small slivers or pieces of the cut metal. About one tenth of the quantity is fed into the mill at one time and the contents of the mill are mechanically "worked" for several minutes before more metal is added. This is repeated several times until the required quantity of sodium is introduced into the mill. Again, the ball mass to sample mass ratio was about 9:1. Total milling time was about 2 to 3 hours and processing took place at near room temperature under a high purity argon gas atmosphere.

After milling, the material formed a dark, hard, metallic-looking material. About 1.5 grams of the sample was transferred (under argon) to a stainless steel reactor vessel described in Example 1 and exposed to high purity (99.999 %) hydrogen gas. The hydrogen was again pressurized to between about 80 atm to about 100 atm while the steel reactor and its contents are heated externally with electrical tape to about 125° C. for up to 20 hours. Pressure measurements were taken using a calibrated 200 atm pressure transducer for the absorption half-cycle and a 1.3 atm calibrated Baratron™ capacitance manometer for the desorption half-cycle. Data was recorded with a computer.

Figure 5:
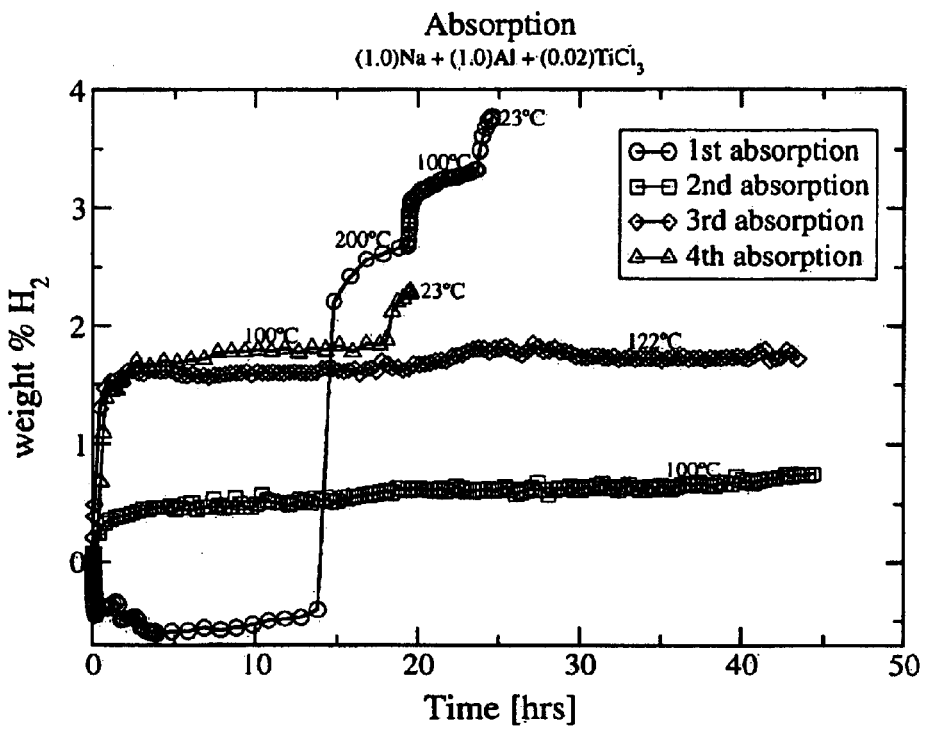
FIG. 5 illustrates the first four hydriding absorption cycles for the example of $NaAlH_4+Na_3AlH_6$ made by the process of the present invention with the starting of 1.0 moles NaH+1.0 mole Al+0.02 moles TiCl$_3$.
Figure 6:
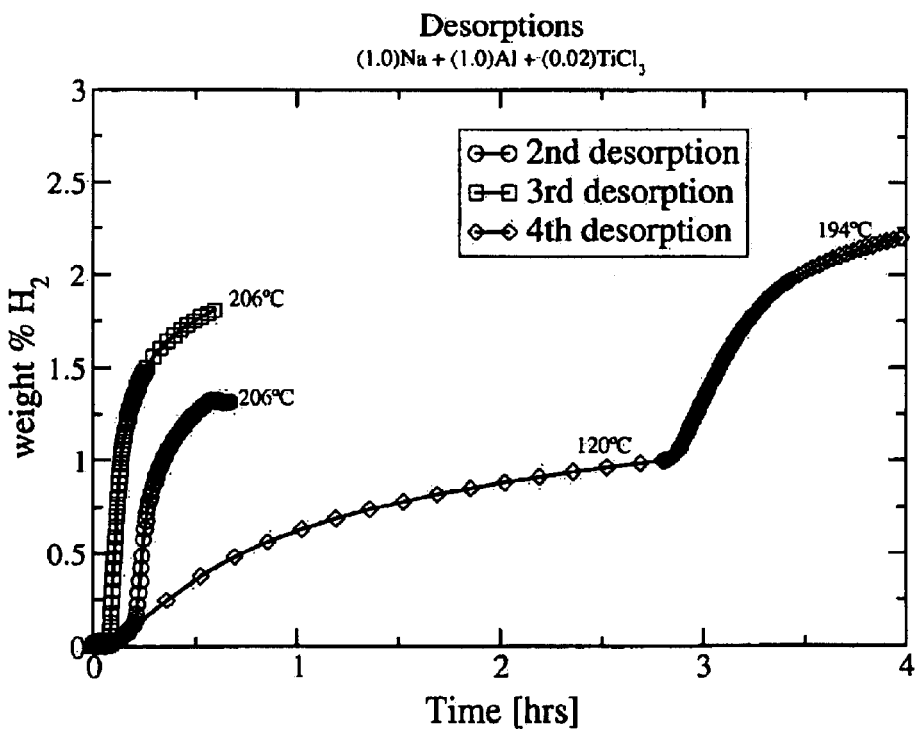
FIG. 6 illustrates the first three desorption hydriding cycles for the example of FIG. 5.

In the initial absorption half-cycle shown in FIG. 5 ($1^{st}$ absorption) the formation of $NaAlH_4$ is preceded by the formation of NaH during the first high temperature excursion at a temperature of about 200° C. Subsequent $NaAlH_4$ formation took place at temperatures between 80° C. and 120° C. (100° C. shown). Greater than 90% of the hydrogen absorption is seen taking place within about a 2 hour period during the initial hydrogenation step. The results demonstrate that $NaAlH_4$ can be prepared from Na metal without the need for a separate process to produce NaH. FIG. 6 shows the material to be fully reversible, releasing about 2 weight percent hydrogen gas in the desorption half-cycle.

Evidence for the formation of $NaAlH_4+Na_3AlH_6$ prepared in this manner was confirmed by the x-ray diffraction pattern shown in FIG. 10. The spectra was obtained (using an airless sample holder) from a portion of the material after the $5^{th}$ hydriding cycle and is displayed as the top (or first) of the three spectra shown in FIG. 10.

EXAMPLE 4

A final example for the fabrication of $NaAlH_4+Na_3AlH_6$ was performed as in EXAMPLE 1 to test the effects of a range of catalyst content on the hydrogenation behavior of the hydride. In this example 3.13 grams of NaH was ball milled together with 3.145 grams of aluminum metal powder and 0.720 grams of the $TiCl_3$ catalyst precursor compound (molar ratios of 1.12:1.0:0.04). Again, milling was preformed in a tungsten carbide lined steel vial with several tungsten carbide balls. Again, excess alkali metal hydride is added to account for the formation of NaCl during processing.

Figure 7:
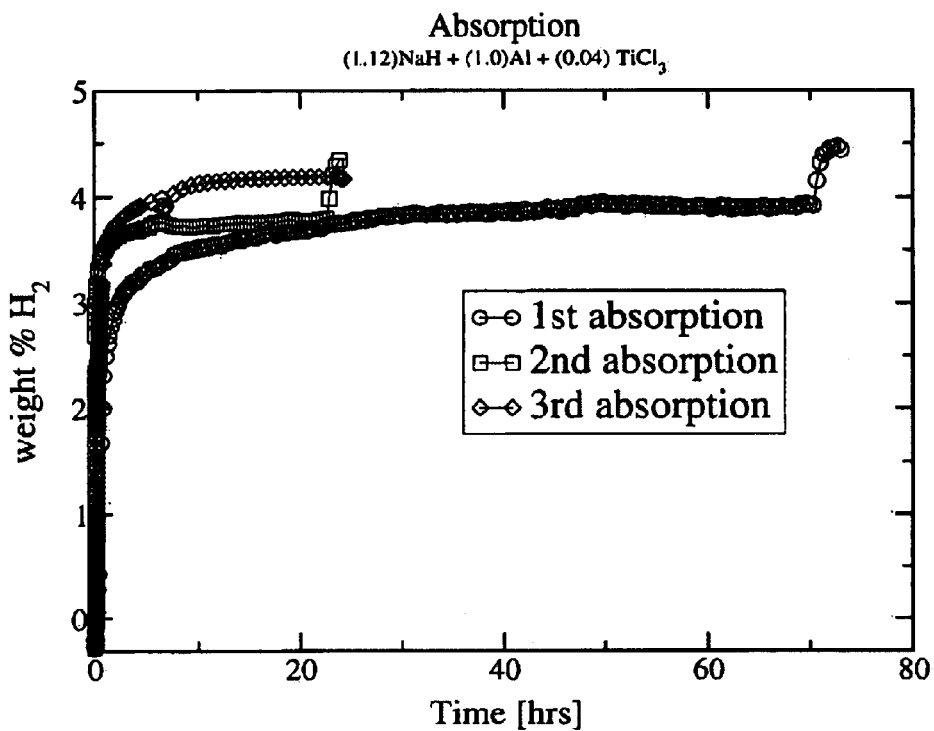
FIG. 7 illustrates the first four hydriding absorption cycles for the example of NaAlH$_4$+Na$_3$AlH$_6$ made by the process of the present invention with the starting of 1.0 moles NaH+1.0 mole Al+0.02 moles TiCl$_3$.
Figure 8:
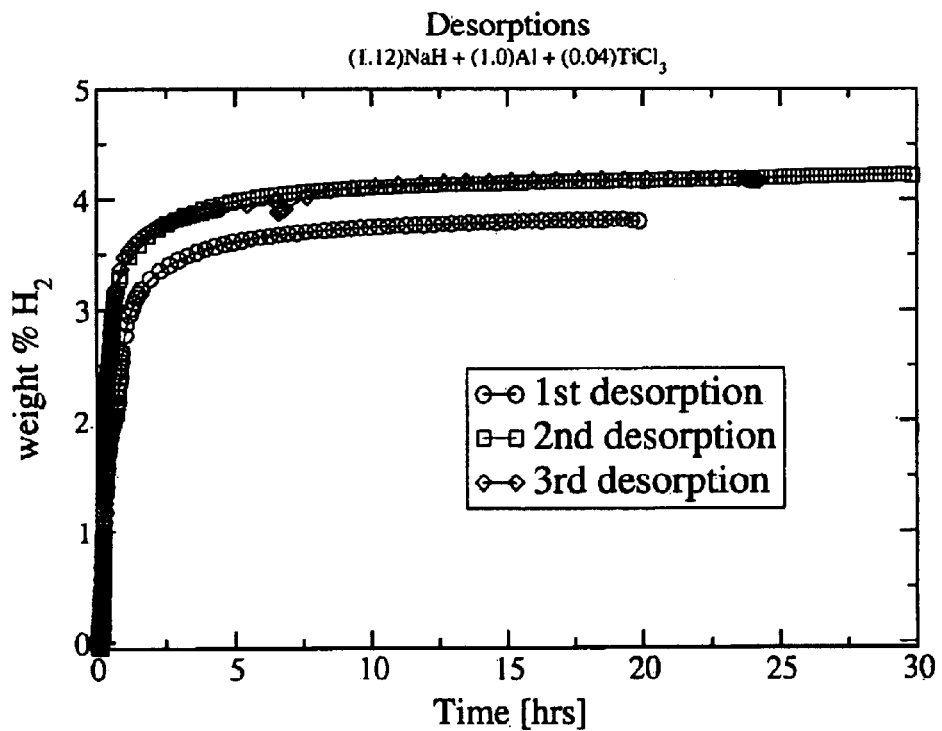
FIG. 8 illustrates the first three desorption hydriding cycles for the example of FIG. 7.

Initial hydrogenation is shown in FIG. 7 as the first half-cycle ($1^{st}$ absorption) and is seen to reach about 90% of its initial first cycle capacity within about 12 hours while FIG. 8 shows initial desorption to 90% of capacity in about 6 hours.

FIGS. 7 and 8 show the next two absorption/desorption half-cycles for this example. As before the absorption and desorption rates substantially improve as due hydrogen capacity. Absorption and desorption capacity increase from about 3.9 weight percent hydrogen to about 4.2 weight percent in the last hydriding cycle while rates for absorption and desorption decrease to 2.5 and 3 hours respectively.

Evidence of the formation of a quantity of $NaAlH_4+Na_3AlH_6$ was again confirmed by the x-ray diffraction pattern shown in FIG. 10. The spectra was obtained (using an airless sample holder) from a portion of the material after the $2^{nd}$ hydriding cycle and is displayed as the lowest of the three spectra shown in FIG. 10.

Figure 9:
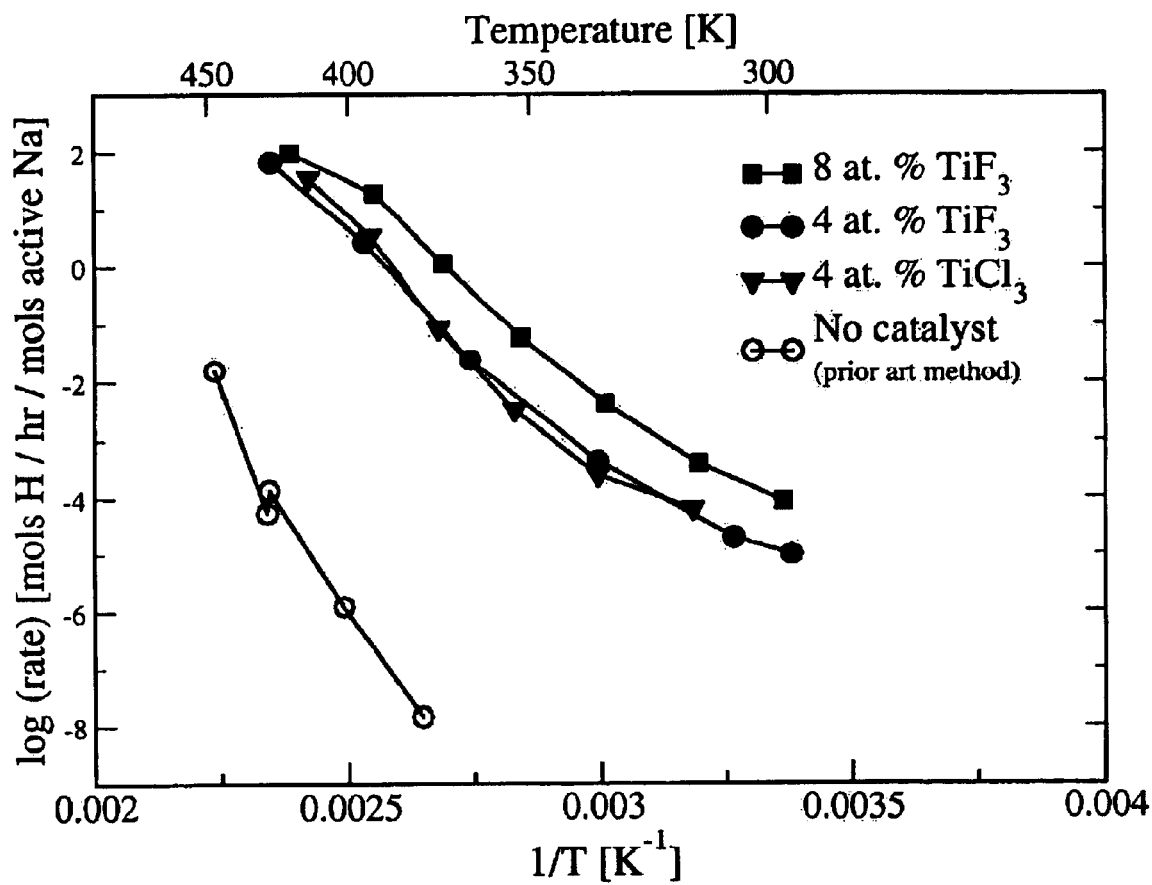
FIG. 9 shows Arrhenius plots of the rates of hydrogen desorption from NaH+Al samples that were hydrided after doping with three different levels of TiCl$_3$ or TiF$_3$ using the direct synthesis method of the present invention to prepare NaAlH$_4$+Na$_3$AlH$_6$.

The foregoing examples, therefore, clearly demonstrate the formation of sodium aluminum hydride. It is believed that lithium and potassium aluminum hydrides may be prepared using a similar technique. It is demonstrated further, as shown in FIG. 9, that the use of the titanium catalyst compound, which some have reported to be unnecessary, has a marked and dramatic effect on the rate of hydrogen desorption from the sodium aluminum hydrides compounded by the present method. FIG. 9 illustrates this effect as multiple Arrhenius plots for several hydride samples that contain various levels of the titanium catalyst compound. These curves clearly show an increase of several orders of magnitude in the kinetics of hydrogen desorption by the doped hydride material over the undoped material and the effect appears to require only a modest amount of the catalyst compound in order to obtain the desired increase in hydrogen transfer rate.

A new and novel method for the preparation of complex alkali metal-aluminum hydride compounds that is capable of reversible hydrogenation has been demonstrated.

We claim:

1. A method for producing complex hydride compounds capable of reversible hydrogenation, comprising:

processing a mixture of NaH powder, aluminum powder, and a powder of a transition metal catalyst compound selected from the list consisting of $TiCl_3$, $TiF_3$, and mixture thereof, in a high energy refractory ball mill for about 2 hours to provide a compounded powder mixture; and hydrogenating said compounded mixture at an elevated temperature and pressure to provide hydride compounds comprising $NaAlH_4$ and $Na_3AlH_6$.

2. The method according to claim 1, wherein the molar ratio of the NaH powder to said aluminum powder is 1:1 to 4:1.

3. The method according to claim 1, wherein said molar ratio of the transition metal catalyst compound to the NaH powder is 1:20 to about 1:100.

4. The method according to claim 1, wherein said step of processing is carried out in an atmosphere consisting essentially of argon.

5. The method according to claim 1, wherein said step of hydrogenation is performed at an initial temperature of above about 60° C., and wherein said hydrogen pressure is maintained above an equilibrium plateau pressure for hydrogen at said initial temperature.

6. The method according to claim 5, wherein said step of hydrogenation is performed at an initial temperature about 125° C., and wherein said hydrogen pressure is maintained at about 100 atmospheres and for at least about 2 hours.

7. A method for producing complex hydride compounds capable of reversible hydrogenation, comprising:

processing a mixture of a comminuted form of sodium metal, aluminum powder, and a powder of a transition metal catalyst compound selected from the list consisting of $TiCl_3$, $TiF_3$, and mixture thereof, in a high energy refractory ball mill for about 2 hours to about 3 hours to provide a compounded powder mixture; and hydrogenating said compound mixture at an elevated temperature and pressure to provide complex hydride compounds comprising $NaAlH_4$ and $Na_3AlH_6$.

8. The method according to claim 7, wherein the molar ratio of the sodium metal to the aluminum is 1:1 to 4:1, and wherein about 10% of said sodium metal is added step-wise to the mixture at intervals of about 20 minutes each.

9. The method according to claim 7, wherein said molar ratio of the transition metal catalyst compound to the sodium metal is 1:6 to about 1:100.

10. The method according to claim 7, wherein said step of processing is carried out in an atmosphere consisting essentially of argon.

11. The method according to claim 7, wherein said step of hydrogenation is performed at an initial temperature above about 60° C., and wherein said hydrogen pressure is maintained above an equilibrium plateau pressure for hydrogen at said temperature.

12. The method according to claim 11, wherein said step of hydrogenation is performed at an initial temperature of about 125° C., and wherein said hydrogen pressure is maintained at about 100 atmospheres for at least about 2 hours.

* * * * *